United States Patent
Mahdi

(10) Patent No.: US 8,520,682 B2
(45) Date of Patent: Aug. 27, 2013

(54) SYSTEM AND METHOD FOR PROVISION OF IMS BASED SERVICES FOR LEGACY CS UE WITH HOME NODE B ACCESS

(75) Inventor: Kaniz Mahdi, Carrollton, TX (US)

(73) Assignee: Futurewei Technologies, Inc., Plano, TX (US)

( * ) Notice: Subject to any disclaimer, the term of this patent is extended or adjusted under 35 U.S.C. 154(b) by 515 days.

(21) Appl. No.: 12/561,734

(22) Filed: Sep. 17, 2009

(65) Prior Publication Data

US 2010/0067493 A1  Mar. 18, 2010

Related U.S. Application Data

(60) Provisional application No. 61/098,152, filed on Sep. 18, 2008.

(51) Int. Cl.
*H04L 12/28* (2006.01)
*H04W 4/00* (2009.01)

(52) U.S. Cl.
USPC .......................................... 370/395; 370/331

(58) Field of Classification Search
USPC ....................................... 370/495, 395, 331
See application file for complete search history.

(56) References Cited

U.S. PATENT DOCUMENTS

| | | | |
|---|---|---|---|
| 7,366,514 B2 | 4/2008 | Ejzak | |
| 7,522,585 B2 | 4/2009 | Liu et al. | |
| 7,975,037 B2 | 7/2011 | Tai et al. | |
| 8,103,267 B2 | 1/2012 | Lee et al. | |
| 2004/0162077 A1 | 8/2004 | Kauranen et al. | |
| 2006/0098598 A1* | 5/2006 | Gallagher | 370/331 |
| 2006/0256752 A1* | 11/2006 | Svensson et al. | 370/331 |
| 2006/0268849 A1 | 11/2006 | Larsson et al. | |

(Continued)

FOREIGN PATENT DOCUMENTS

| | | |
|---|---|---|
| CN | 1756242 A | 4/2006 |
| CN | 1870553 A | 11/2006 |

(Continued)

OTHER PUBLICATIONS $3^{rd}$ Generation Partnership Project, Technical Specification Group Core Network and Terminals, "Handover procedures," Release 7, 3GPP TS 23.009 V7.0.0, Mar. 2007, pp. 1-287.

(Continued)

*Primary Examiner* — Mark Rinehart
*Assistant Examiner* — Angel Brockman
(74) *Attorney, Agent, or Firm* — Slater & Matsil, L.L.P.

(57) ABSTRACT

A system and method for providing user equipment (UE) mobility between a packet-switched system and a circuit-switched system is provided. In an embodiment, handover from a circuit-switched connection via a 3G Home Node B (3G HNB) to a circuit-switched connection via a Base Station System (BSS) is provided. In another embodiment, handover from a packet-switched connection via the 3G HNB to a circuit-switched connection via a BSS is provided. In yet another embodiment, handover from a packet-switched connection via a Long Term Evolution (LTE) access point to a circuit-switched connection via a 3G HNB is provided. Once handover is completed, an Interworking Function (IWF) is provided that acts as a Session Initiation Protocol (SIP) for translating circuit-switched signaling messages to SIP messages for packet-switched signaling. The bearer path comprises a circuit-switched bearer path to a Media Gateway (MGW), which provides a packet-switched bearer path toward the remote end.

25 Claims, 10 Drawing Sheets

(56) References Cited

U.S. PATENT DOCUMENTS

| | | | |
|---|---|---|---|
| 2006/0281459 | A1 | 12/2006 | Marinescu et al. |
| 2007/0058788 | A1 | 3/2007 | Mahdi et al. |
| 2007/0061397 | A1 | 3/2007 | Gregorat et al. |
| 2007/0121608 | A1 | 5/2007 | Gu et al. |
| 2007/0213078 | A1 | 9/2007 | Shaheen |
| 2007/0281717 | A1 | 12/2007 | Bharadwaj |
| 2008/0009287 | A1 | 1/2008 | Donovan et al. |
| 2008/0032695 | A1 | 2/2008 | Zhu et al. |
| 2008/0090570 | A1 | 4/2008 | Deshpande et al. |
| 2008/0117878 | A1* | 5/2008 | Kim et al. ............... 370/331 |
| 2008/0181205 | A1 | 7/2008 | Azada et al. |
| 2008/0291874 | A1* | 11/2008 | Bae et al. ............... 370/331 |
| 2008/0316998 | A1 | 12/2008 | Procopio et al. |
| 2009/0086719 | A1 | 4/2009 | Mutikainen et al. |
| 2009/0104905 | A1* | 4/2009 | DiGirolamo et al. ......... 455/434 |
| 2009/0147754 | A1 | 6/2009 | Long et al. |
| 2009/0156213 | A1 | 6/2009 | Spinelli et al. |
| 2009/0257418 | A1 | 10/2009 | Allen et al. |
| 2009/0265543 | A1* | 10/2009 | Khetawat et al. ............. 713/151 |
| 2010/0041405 | A1 | 2/2010 | Gallagher et al. |
| 2010/0048216 | A1 | 2/2010 | Sundarraman et al. |
| 2010/0069101 | A1 | 3/2010 | Mahdi et al. |
| 2010/0074223 | A1 | 3/2010 | Mahdi |
| 2010/0074224 | A1 | 3/2010 | Mahdi et al. |
| 2010/0077459 | A1 | 3/2010 | Mahdi et al. |
| 2010/0238920 | A1 | 9/2010 | Salkintzis et al. |
| 2010/0293265 | A1 | 11/2010 | Lindholm et al. |
| 2010/0309822 | A1 | 12/2010 | Witzel et al. |

FOREIGN PATENT DOCUMENTS

| | | |
|---|---|---|
| CN | 101061729 A | 10/2007 |
| CN | 101166133 A | 4/2008 |
| CN | 101212386 A | 7/2008 |
| CN | 101262656 A | 9/2008 |
| EP | 1 909 438 A1 | 4/2008 |
| WO | WO 01/89251 A1 | 11/2001 |
| WO | WO 2007/009298 A1 | 1/2007 |
| WO | WO 2008/081310 A1 | 7/2008 |
| WO | WO 2010/031349 A1 | 3/2010 |

OTHER PUBLICATIONS

3$^{rd}$ Generation Partnership Project, Technical Specification Group Core Network and Terminals, "Handover procedures," Release 8, 3GPP TS 23.009 V8.1.0, Mar. 2009, pp. 1-289.

3$^{rd}$ Generation Partnership Project, Technical Specification Group Services and System Aspects, "Support of Short Message Service (SMS) over generic 3GPP Internet Protocol (IP) access," Stage 2, Release 8, 3GPP TS 23.204 V8.2.0, Jun. 2008, pp. 1-37.

3$^{rd}$ Generation Partnership Project, Technical Specification Group Services and System Aspects, "Support of Short Message Service (SMS) over generic 3GPP Internet Protocol (IP) access," Stage 2, Release 8, 3GPP TS 23.204 V8.4.0, Mar. 2009, pp. 1-37.

3$^{rd}$ Generation Partnership Project, Technical Specification Group Services and System Aspects, "Single Radio Voice Call Continuity (SRVCC)," Stage 2, Release 8, 3GPP TS 23.216 V8.0.0, Jun. 2008, pp. 1-20.

3$^{rd}$ Generation Partnership Project, Technical Specification Group Services and System Aspects, "Single Radio Voice Call Continuity (SRVCC)," Stage 2, Release 9, 3GPP TS 23.216 V9.0.0, Jun. 2009, pp. 1-39.

3$^{rd}$ Generation Partnership Project, Technical Specification Group Services and System Aspects, "IP Multimedia Subsystem (IMS)," Stage 2, Release 8, 3GPP TS 23.228 V8.5.0, Jun. 2008, pp. 1-240.

3$^{rd}$ Generation Partnership Project, Technical Specification Group Services and System Aspects, "IP Multimedia Subsystem (IMS)," Stage 2, Release 9, 3GPP TS 23.228 V9.0.0, Jun. 2009, pp. 1-250.

3$^{rd}$ Generation Partnership Project, Technical Specification Group Services and Architecture, "IP Multimedia Subsystem (IMS) Service Continuity," Stage 2, Release 8, 3GPP TS 23.237 V8.0.0, Jun. 2008, pp. 1-40.

3$^{rd}$ Generation Partnership Project, Technical Specification Group Services and Architecture, "IP Multimedia Subsystem (IMS) Service Continuity," Stage 2, Release 9, 3GPP TS 23.237 V9.1.0, Jun. 2009, pp. 1-88.

3$^{rd}$ Generation Partnership Project, Technical Specification Group Services and System Aspects, "IP Multimedia Subsystem (IMS) Centralized Services," Stage 2, Release 8, 3GPP TS 23.292 V8.0.0, Jun. 2008, pp. 1-89.

3$^{rd}$ Generation Partnership Project, Technical Specification Group Services and System Aspects, "IP Multimedia Subsystem (IMS) centralized services," Stage 2, Release 9, 3GPP TS 23.292 V9.2.0, Jun. 2009, pp. 1-105.

3$^{rd}$ Generation Partnership Project, Technical Specification Group Services and System Aspects, "IMS Aspects of Architecture for Home NodeB," Stage 2, Release 9, 3GPP TR 23.832 V0.4.0, May 2009, pp. 1-61.

3$^{rd}$ Generation Partnership Project, Technical Specification Group Services and System Aspects, "IP Multimedia Subsystem (IMS) service continuity enhancements; Service, policy and interaction," Stage 2, Release 9, 3GPP TR 23.838 V9.0.0, Jun. 2009, pp. 1-51.

3$^{rd}$ Generation Partnership Project, Technical Specification Group Core Network and Terminals, "Mobile radio interface Layer 3 specification; Core network protocols," Stage 3, Release 8, 3GPP TS 24.008 V8.2.0, Jun. 2008, pp. 1-553.

3$^{rd}$ Generation Partnership Project, Technical Specification Group Core Network and Terminals, "Mobile radio interface Layer 3 specification; Core network protocols," Stage 3, Release 8, 3GPP TS 24.008 V8.6.0, Jun. 2009, pp. 1-582.

3$^{rd}$ Generation Partnership Project, Technical Specification Group Core Network and Terminals, "IP multimedia call control protocol based on Session Initiation Protocol (SIP) and Session Description Protocol (SDP)," Stage 3, Release 9, 3GPP TS 24.229 V9.0.0, Jun. 2009, pp. 1-623.

3$^{rd}$ Generation Partnership Project, Technical Specification Group Radio Access Network, "UTRAN Iu interface RANAP signalling," Release 7, 3GPP TS 25.413 V7.9.0, Jun. 2008, pp. 1-359.

3$^{rd}$ Generation Partnership Project, Technical Specification Group Radio Access Network, "UTRAN Iu interface Radio Access Network Application Part (RANAP) signalling," Release 8, 3GPP TS 25.413 V8.3.0, Jun. 2009, pp. 1-398.

3$^{rd}$ Generation Partnership Project, Technical Specification Group Radio Access Network, "UTRAN architecture for 3G Home Node B (HNB)," Stage 2, Release 8, 3GPP TS 25.467 V8.2.0, Jun. 2009, pp. 1-26.

3$^{rd}$ Generation Partnership Project, Technical Specification Group Core Network and Terminals, "Evolved Packet System; 3GPP EPS Sv interface (MME to MSC) for SRVCC," Release 8, 3GPP TS 29.280 V1.0.1, Sep. 2008, pp. 1-10.

3$^{rd}$ Generation Partnership Project, Technical Specification Group Core Network and Terminals, "Evolved Packet System (EPS); 3GPP Sv interface (MME to MSC, and SGSN to MSC) for SRVCC," Release 8, 3GPP TS 29.280 V8.1.0, Mar. 2009, pp. 1-13.

3$^{rd}$ Generation Partnership Project, Technical Specification Group Services and System Aspects, "Security aspects of early IP Multimedia Subsystem (IMS)," Release 8, 3GPP TS 33.178 V1.0.0, Mar. 2008, pp. 1-26.

3$^{rd}$ Generation Partnership Project, Technical Specification Group Services and System Aspects, "3GPP System Architecture Evolution (SAE); Security architecture," Release 8, 3GPP TS 33.401 V8.0.0, Jun. 2008, pp. 1-45.

3$^{rd}$ Generation Partnership Project, Technical Specification Group Services and System Aspects, "3GPP System Architecture Evolution (SAE); Security architecture," Release 9, 3GPP TS 33.401 V9.0.0, Jun. 2009, pp. 1-99.

"International Search Report," International Application No. PCT/CN2009/074020, Applicant: Huawei Technologies Co., Ltd., et al., Dec. 31, 2009, 4 pages.

"Written Opinion of the International Searching Authority," International Application No. PCT/CN2009/074020, Applicant: Huawei Technologies Co., Ltd., et al., Dec. 31, 2009, 5 pages.

3rd Generation Partnership Project, Technical Specification Group Radio Access Network, "UTRAN Iu interface RANAP signalling," Release 8, 3GPP TS 25.413 V8.0.0, Sep. 2008, pp. 1-374.

3rd Generation Partnership Project, Technical Specification Group Services and System Aspects, "Single Radio Voice Call Continuity (SRVCC)," Stage 2, Release 8, 3GPP TS 23.216 V8.1.0, Sep. 2008, pp. 1-29.

3rd Generation Partnership Project, Technical Specification Group Services and System Aspects, "IP Multimedia Subsystem (IMS)," Stage 2, Release 8, 3GPP TS 23.228 V8.6.0, Sep. 2008, pp. 1-241.

3rd Generation Partnership Project, Technical Specification Group Services and Architecture, "IP Multimedia Subsystem (IMS) Service Continuity," Stage 2, Release 8, 3GPP TS 23.237 V8.1.0, Sep. 2008, pp. 1-41.

3rd Generation Partnership Project, Technical Specification Group Services and System Aspects, "IP Multimedia Subsystem (IMS) Centralized Services," Stage 2, Release 8, 3GPP TS 23.292 V8.1.0, Sep. 2008, pp. 1-90.

3rd Generation Partnership Project, Technical Specification Group Core Network and Terminals, "Mobile radio interface Layer 3 specification; Core network protocols," Stage 3, Release 8, 3GPP TS 24.008 V8.3.0, Sep. 2008, pp. 1-556.

PCT Notification of Transmittal of the International Search Report and the Written Opinion of the International Searching Authority, or the Declaration, International Application No. PCT/CN2009/074027, Huawei Technologies Co. Ltd., et al., Dec. 24, 2009, 10 pages.

International Search Report and the Written Opinion of the Patent Cooperation Treaty, received in International Application No. PCT/CN2009/074028, Huawei Technologies Co. Ltd., et al., mailed Dec. 31, 2009, 10 pages.

Zho, X., et al, "Solution to Fixed Mobile Network Convergence: Femtocell," Mobile Communications, May 2008, No. 6, pp. 59-65.

* cited by examiner

SYSTEM AND METHOD FOR PROVISION OF IMS BASED SERVICES FOR LEGACY CS UE WITH HOME NODE B ACCESS

This application claims the benefit of U.S. Provisional Application No. 61/098,152, filed on Sep. 18, 2008, entitled "System and Method for Provision of IMS Based Services for Legacy CS UE with Home Node B Access," which application is hereby incorporated herein by reference.

CROSS-REFERENCE TO RELATED APPLICATIONS

This application relates to the following co-pending and commonly assigned patent applications: Ser. No. 12/486,645, filed Jun. 17, 2009, entitled "System and Method for Provision of IMS Based Services for Legacy CS UE with Home Node B Access," Ser. No. 12/561,825, filed Sep. 17, 2009, entitled "Attach and Handover for IMS Systems for Legacy CS UE with Home Node B Access," Ser. No. 12/561,850, filed Sept. 17, 2009, entitled "Attach and Handover for IMS Systems for Legacy CS UE with Home Node B Access," and Ser. No. 12/561,877, filed Sep. 17, 2009, entitled "Attach and Handover for IMS Systems for Legacy CS UE with Home Node B Access," which applications are incorporated herein by reference.

TECHNICAL FIELD

The present invention relates generally to telecommunications and, more particularly, to a system and method for providing mobility to circuit-switched (CS) user equipment (UE) using IP Multimedia Subsystem (IMS)-based services.

BACKGROUND

In telecommunications, a femtocell—originally known as an Access Point Base Station—is a small cellular base station, typically designed for use in residential or small business environments. It connects to the service provider's network via broadband (such as DSL or cable). A femtocell allows service providers to extend service coverage indoors, especially where access would otherwise be limited or unavailable. The femtocell incorporates the functionality of a typical base station, but extends it to allow a simpler, self-contained deployment.

A Node B is an element of a 3G macro Radio Access Network (RAN), and a 3G Home Node B (3G HNB) is the 3GPP's term for a 3G femtocell. Within a 3G HNB Access Network there are two network elements: a 3G HNB (or femtocell) and a 3G Home Node B Gateway (3G HNB GW). The 3G HNB is connected to an existing residential broadband service and provides 3G radio coverage for 3G handsets within a home. The 3G HNB GW is installed within an operator's network and aggregates traffic from a large number of 3G HNBs back into an existing core service network.

The 3G network, as well as the next generation standard, referred to as Long Term Evolution (LTE), is an Internet Protocol (IP)-based network architecture. As the telecommunications network has evolved, mobile devices have also evolved to act as IP devices. IP devices typically implement IP Multimedia Subsystem (IMS) sessions that utilize packet-switched (PS) communications instead of CS communications. Legacy CS devices, however, are unable to communicate with the PS network, and hence, the legacy CS devices are unable to utilize services or take advantage of the capabilities offered by IMS systems or other PS networks. Furthermore, multi-mode (e.g., 2G/3G multi-mode devices) devices may initially connect via PS communications, but roam to an area that is not serviced by PS communications. In these situations, there is a need for a method and system that allow the legacy CS devices to utilize IMS services when communicating via a femtocell, as well as allow multi-mode devices to roam between PS networks and CS networks.

SUMMARY OF THE INVENTION

These and other problems are generally solved or circumvented, and technical advantages are generally achieved, by preferred embodiments of the present invention which provide for access to IP Multimedia Subsystem (IMS) sessions using a circuit-switched (CS) device.

Embodiments of the present invention provide a system and a method for allowing legacy circuit-switched user equipment (CS UE) to operate via a packet-switched (PS) system, such as an IP Multimedia Subsystem (IMS) system. An embodiment utilizes an Interworking Function (IWF) with an agent that interfaces between the CS system and a PS system.

In an embodiment, a communications session is established between UE and a 3G Home Node B (3G HNB) via a CS connection, such that the bearer path extends through a Media Gateway (MGW) and signaling path extends through an Interworking Function (IWF). The communications session is handed over from the 3G HNB to a Base Station System (BSS). After handover is completed, the bearer path extends through the MGW and the signaling path extends through the IWF. The MGW translates between a bearer channel between the CS network and the PS network, and the IWF translates between PS signaling and CS signaling.

In another embodiment, a communications session is initially established between a UE and a 3G HNB via a PS connection. In this embodiment, handover is performed such that the bearer path extends through the MGW and the signaling path extends through the IWF. The MGW translates a bearer path between the CS network and the PS network, and the IWF translates between PS signaling and CS signaling.

In yet another embodiment, a communications session is initially established between a UE and an Enhanced Node B (eNodeB) via a PS communications path. A handover to a 3G HNB via a CS communications path is performed. After handover, the bearer path extends through the MGW, wherein the MGW translates the bearer path between the CS network and the PS network toward the remote end. The signaling path extends through the IWF, wherein the IWF translates between PS signaling and CS signaling.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the present invention allow user equipment (UE) configured to only provide circuit-switched (CS) communications to access the packet-switched (PS) network, and hence, IP Multimedia Subsystem (IMS) services, as well as allowing mobility between access points of different networks, such as mobility between a packet-switched (PS) network and a circuit-switched (CS) network. Embodiments of the present invention will be described with respect to embodiments in specific contexts, namely a system and method for the provision and mobility of IMS-based services accessed via a 3G Home Node B (3G HNB) using PS or CS communications, a Base Station System (BSS) using CS communications, and/or a Long Term Evolution (LTE) Access using PS communications. Other embodiments of the present invention, however, may be applied to ad hoc networks, cellular networks, wireline networks, and the like, as well as other architectural configurations.

As discussed in greater detail below, an embodiment of the present invention provides a Session Initiation Protocol (SIP) agent collocated with an Interworking Function (IWF) for interworking CS session control procedures with SIP session control procedures to provide active mode mobility between macro CS and macro PS networks. It should be noted, however, that the following embodiments are provided for illustrative purposes only and are not intended to limit the scope of the present invention to only those embodiments described herein. Furthermore, it should be noted that the messages and the message parameters are provided for illustrative purposes only and that other messages and parameters may be used, as well as any suitable protocol, such as session description protocol (SDP), session initiation protocol (SIP), or the like. Additional information regarding the various network elements, interfaces, and message flows may be found in 3GPP TS 23.228, v9.0.0, 3GPP TS 23.237, v9.1.0, 3GPP TS 23.009, v8.1.0, 3GPP TS 23.216, v9.0.0, 3GPP TS 23.228, v9.0.0, and 3GPP TS 23.292, 9.2.0, all of which are incorporated herein by reference.

Figure 1:
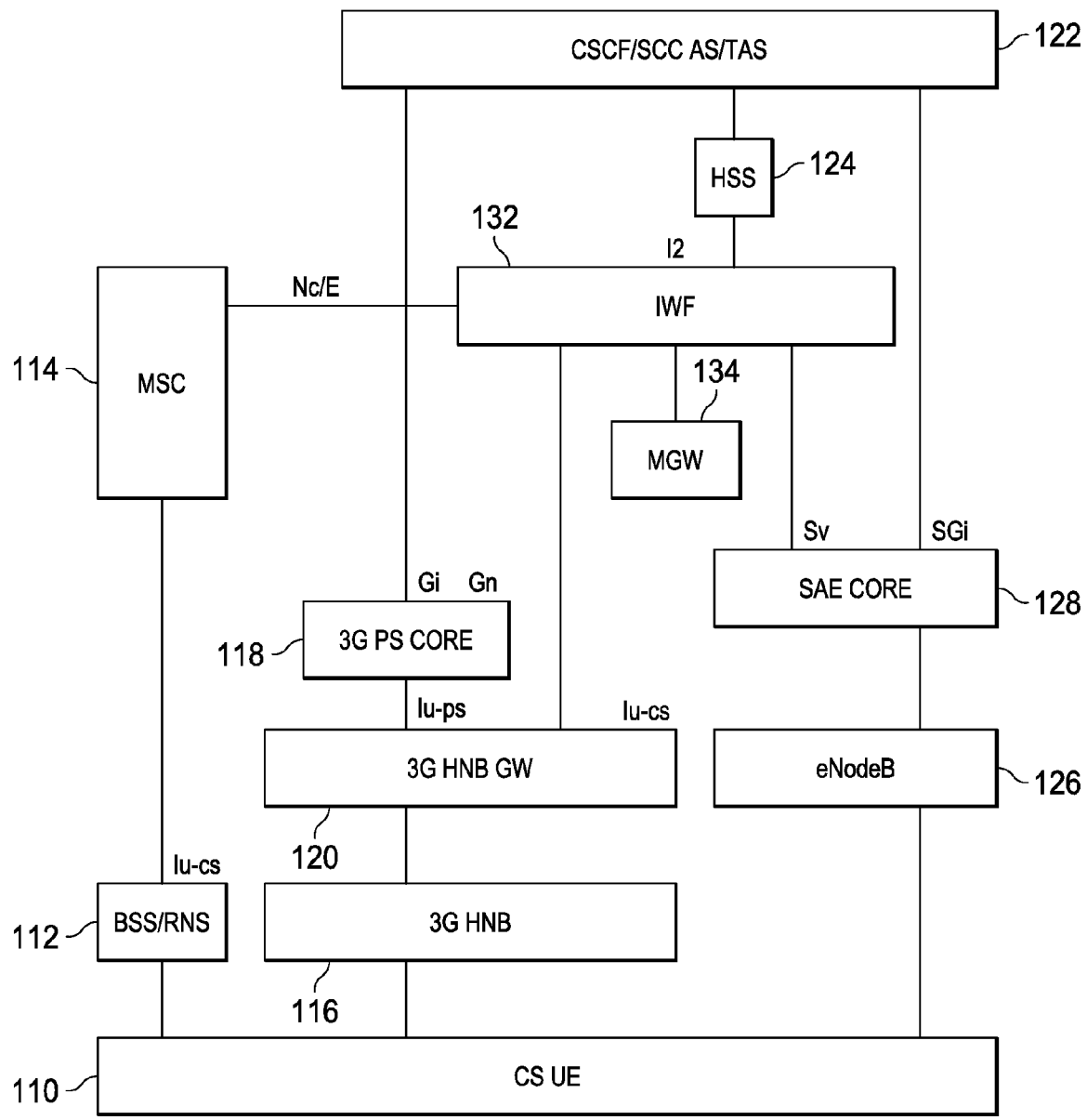
FIG. 1 illustrates a functional architecture diagram in accordance with an embodiment of the present invention.

Referring now to FIG. 1, there is shown a functional architecture diagram in accordance with an embodiment of the present invention. A UE 110 comprises a user device and may include any type of device providing voice and/or data access, such as a wireless phone, computer, personal data assistant (PDA), or the like. Generally, in legacy systems the UE 110 connects via a Base Station Subsystem (BSS)/Radio Network Subsystem (RNS) 112, which provides the connectivity and wireless transmission interface between the UE 110 and a mobile switching center (MSC) 114, which is part of the CS Core network.

In an IMS system, a 3G HNB 116 acts as an access point, typically within a user's home, for the UE 110 to provide a PS connection to the 3G PS core 118 via a 3G HNB Gateway (GW) 120. An IMS session is created between the UE 110 and a remote end (not shown), thereby enabling the UE 110 to access media flows. The session control signaling flow extends between the UE 110 and a Call Session Control Function (CSCF), and possibly a Service Centralization Continuity Application Server (SCC AS) or other telephony application servers (TAS), collectively shown in FIG. 1 as reference numeral 122.

Generally, the CSCF processes SIP signaling packets in the IMS system, and the telephony application servers host and execute a variety of services. In one embodiment, the SCC AS operates in a Back-to-Back User Agent (B2BUA) mode wherein it acts as an SIP element to mediate SIP signaling between the UE and the remote end. The telephony application servers may be executed on the remote leg as part of standard service execution logic at the CSCF.

An IWF 132, which provides functionality similar to a mobile switching center (MSC) in the macro CS network, is responsible for interfacing with the femtocell system to provide handover capability between the CS network of the macro CS core network (e.g., the BSS/RNS 112 and MSC 114) and the PS network (e.g., the 3G HNB 116). The IWF 132 also connects to a media gateway (MGW) 134, which provides translation services between the IMS network and the macro CS network for media flows over the CS network, and a home subscriber server (HSS) 124, which provides a subscriber database and contains user-related subscription data, such as location information, security information, user profile information, and the like, required to handle IMS sessions.

Also shown in FIG. 1 are elements of the Long Term Evolution (LTE) network. In particular, an LTE access point, e.g., an Enhanced Node B (eNodeB) 126, provides 4G connectivity via a wireless interface. The eNodeB 126 in turn provides network access to the System Architecture Evolution (SAE) Core 128, e.g., the PS core network for 4G.

It should be noted that other network elements, such as routers, gateways, switches, and/or the like, may be present within the networks. The configurations and the communications between network elements are provided for illustrative purposes only, and as such, the communications between the specified elements may be between different elements and/or through additional elements, as well as different signaling/commands may be used.

Figure 4:
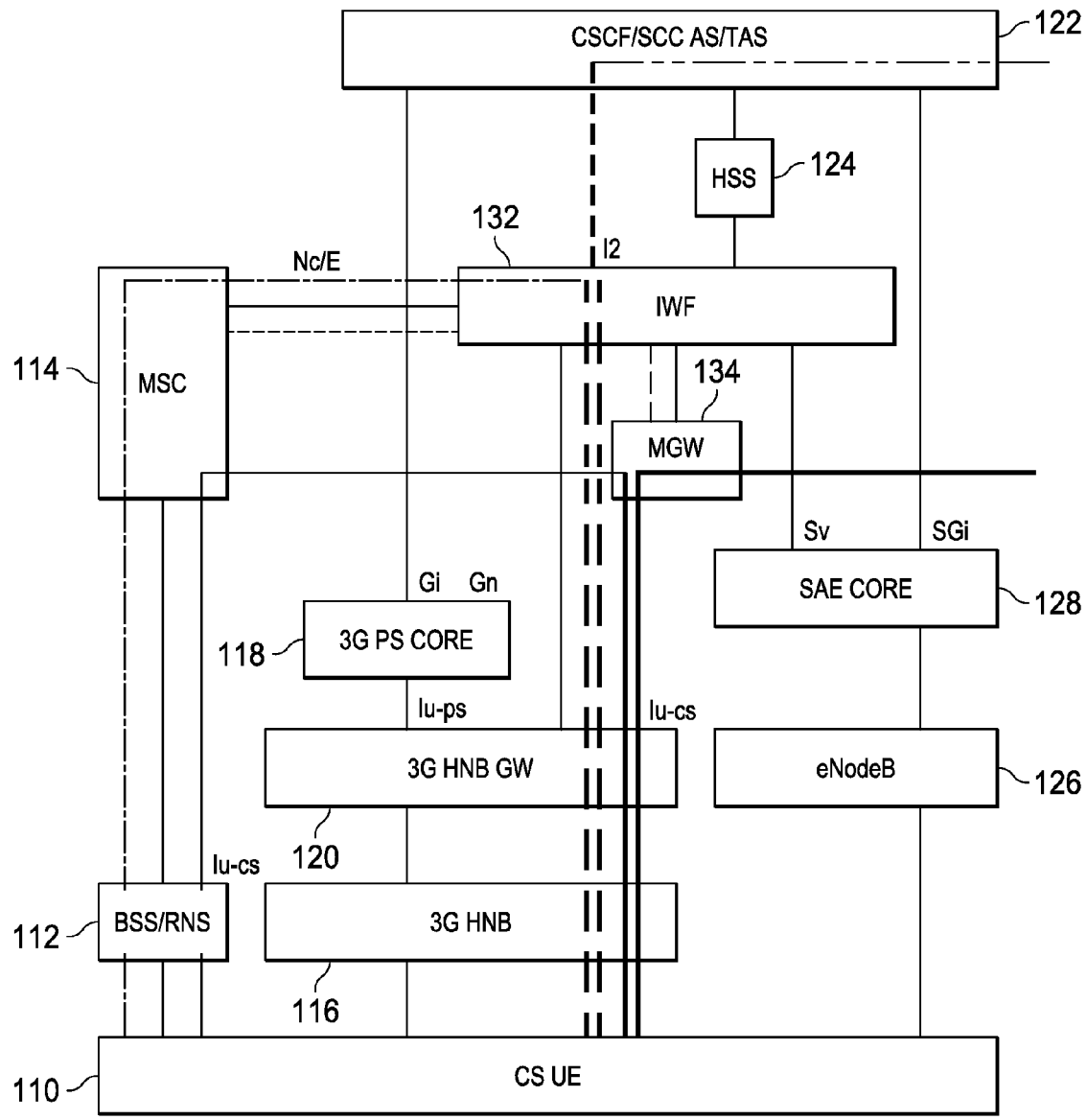
FIG. 4 is a functional architecture diagram illustrating signaling and bearer channels before and after a handover from a 3G Home Node B to a Base Station System in accordance with an embodiment of the present invention.
Figure 5:
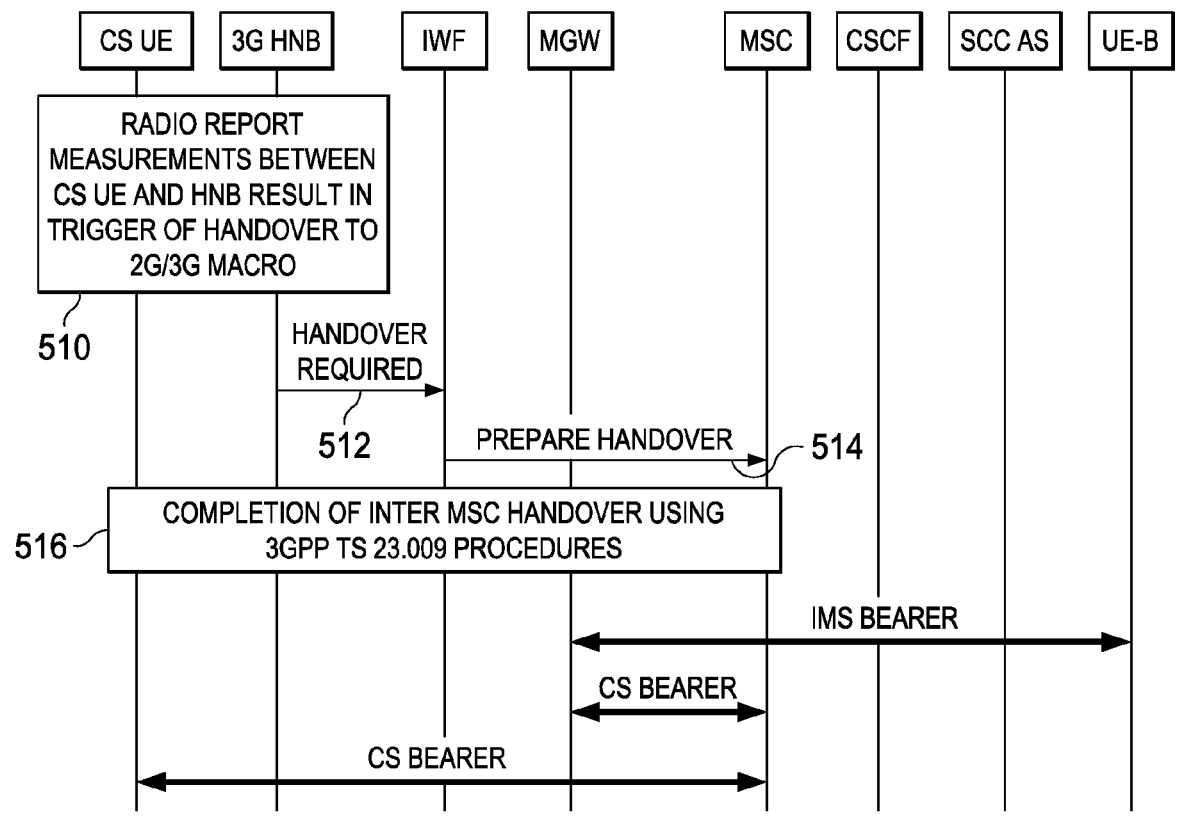
FIG. 5 is a message flow diagram illustrating a handover from a 3G Home Node B to a Base Station System in accordance with an embodiment of the present invention.
Figure 6:
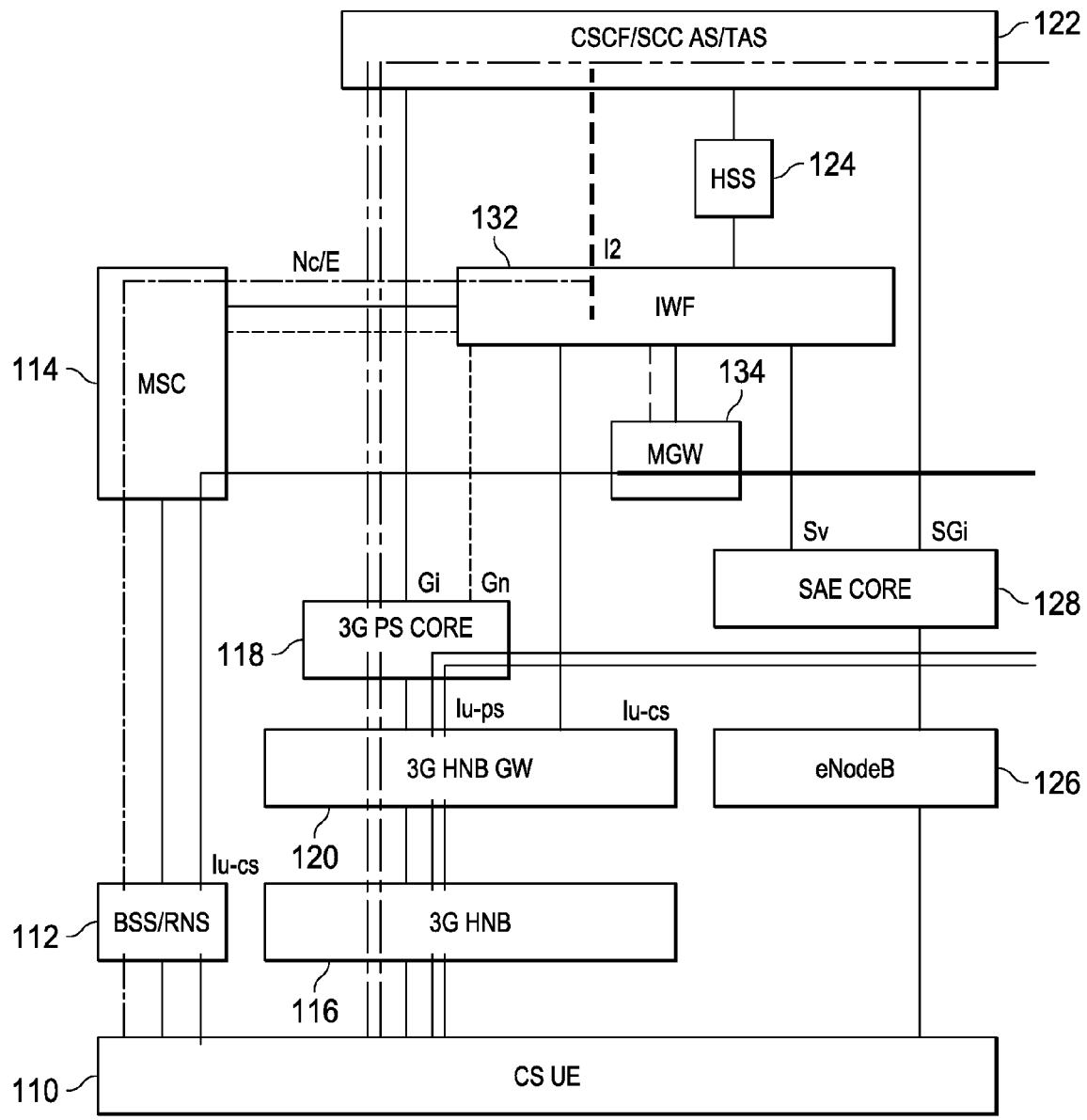
FIG. 6 is a functional architecture diagram illustrating signaling and bearer channels before and after a handover from a 3G Home Node B to a Base Station System in accordance with another embodiment of the present invention.
Figure 7:
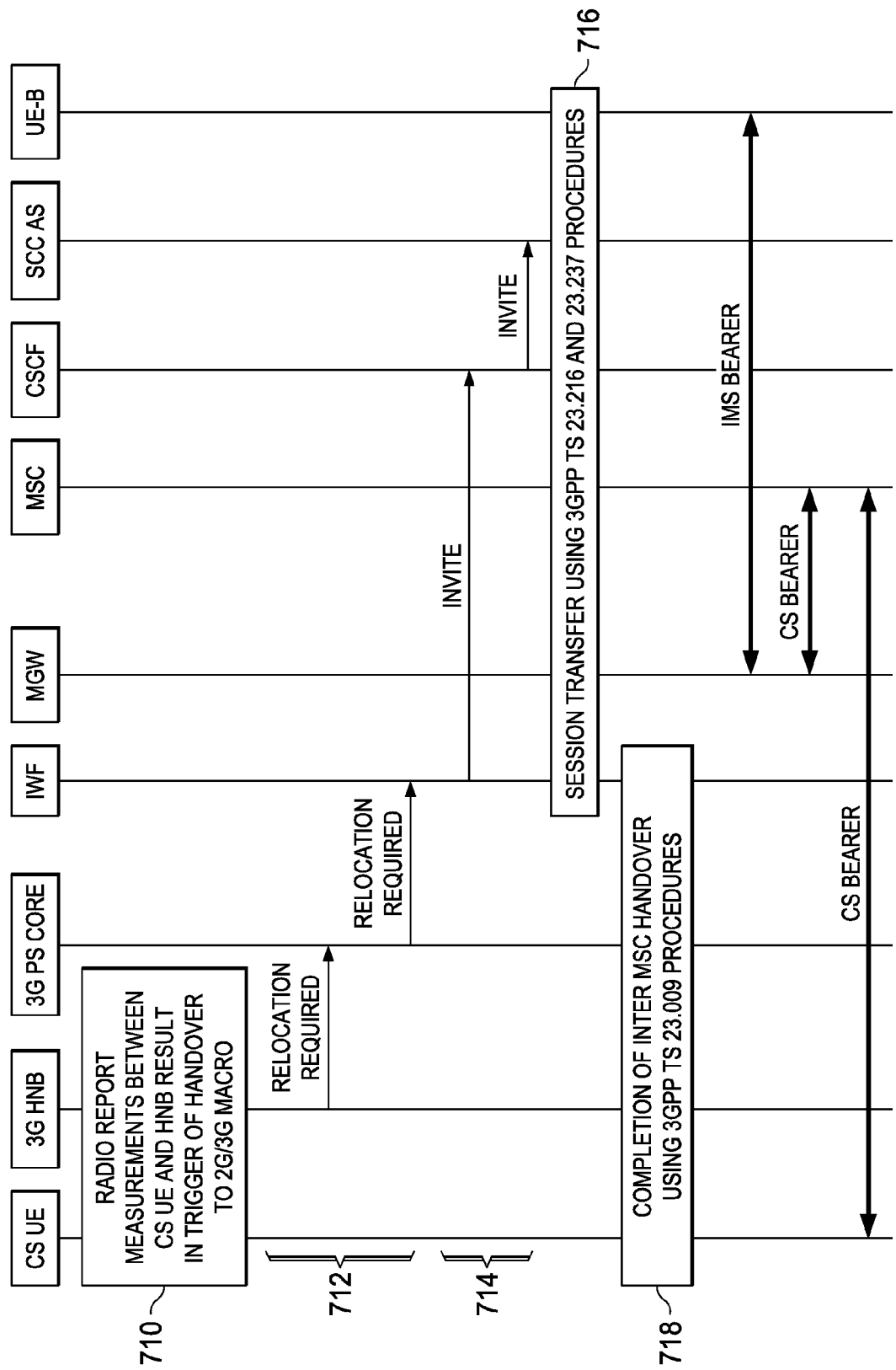
FIG. 7 is a message flow diagram illustrating a handover from a 3G Home Node B to a Base Station System in accordance with another embodiment of the present invention.
Figure 8:
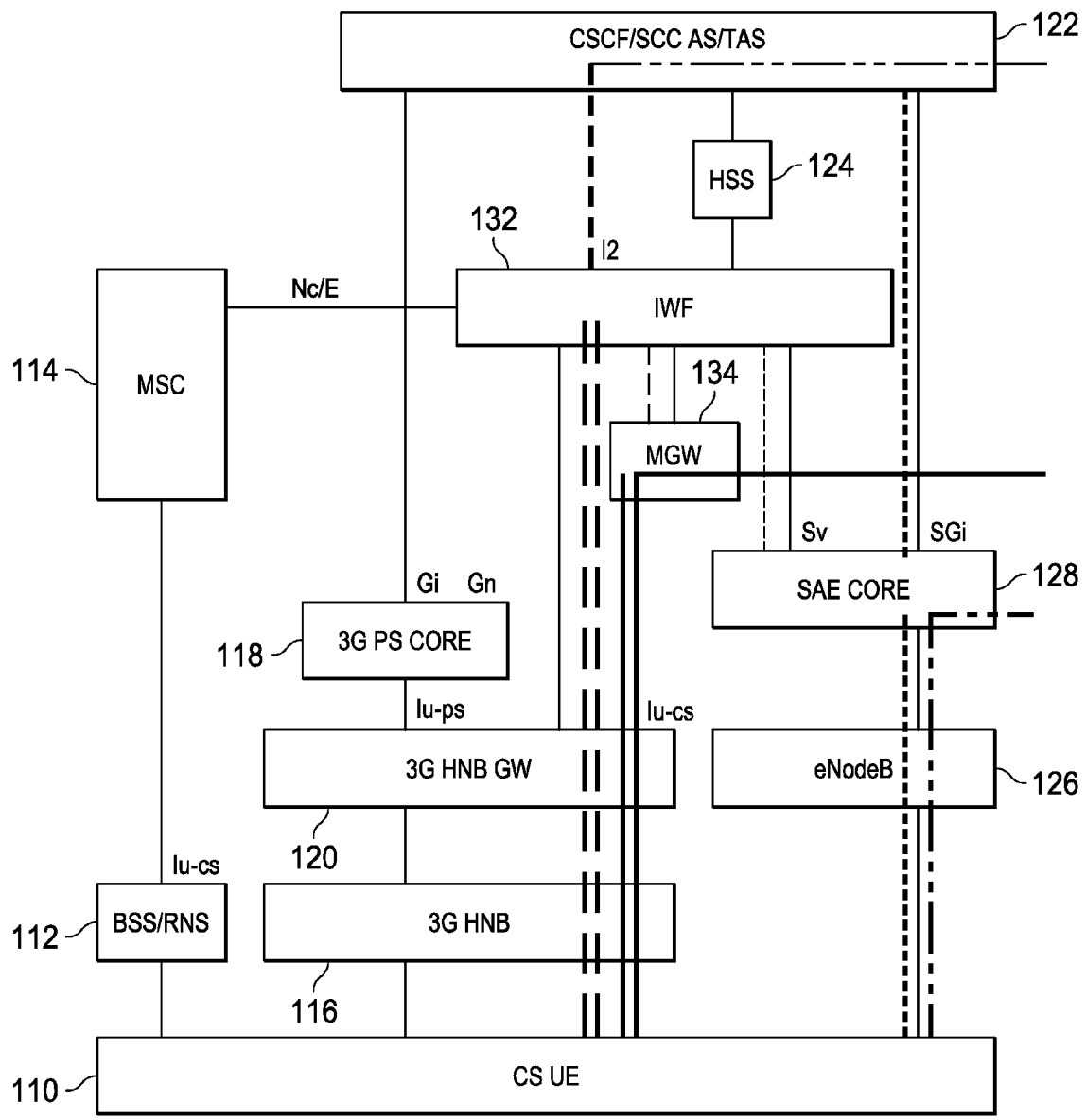
FIG. 8 is a functional architecture diagram illustrating signaling and bearer channels before and after a handover from an Enhanced NodeB for Long Term Evolution Access to a 3G HNB in accordance with an embodiment of the present invention.
Figure 9:
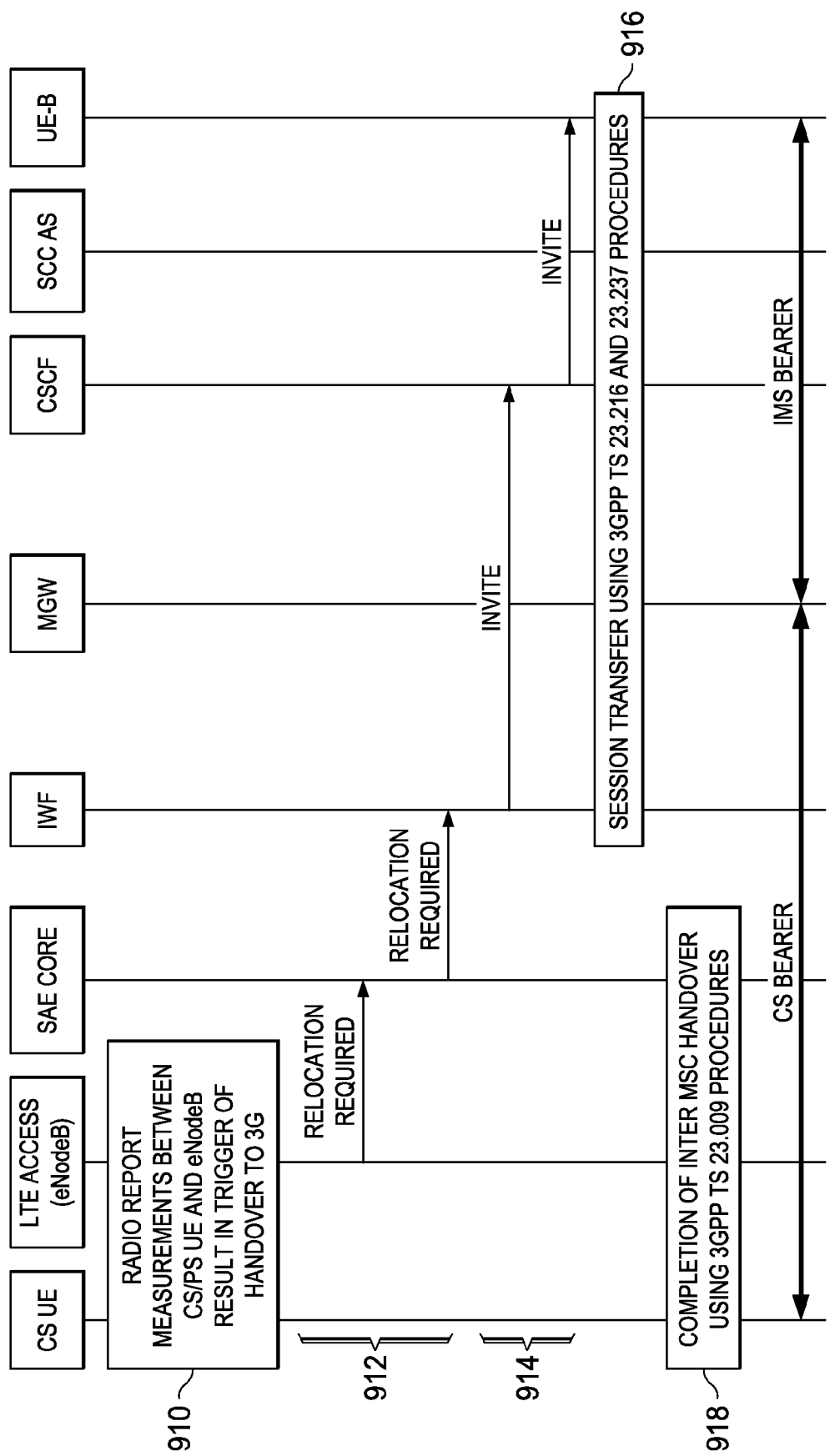
FIG. 9 is a message flow diagram illustrating a handover from an Enhanced NodeB for Long Term Evolution Access to a 3G Home Node B in accordance with an embodiment of the present invention.

One of ordinary skill in the art will realize that the above architecture provides various types of access to different types of networks. The description in the following paragraphs provides examples of performing handovers between these different types of networks in accordance with embodiments of the present invention. In particular, FIGS. 4 and 5 illustrate a method of handing over a UE from a 3G HNB, attached via a CS communications channel, to the BSS/RNS. FIGS. 6 and 7 illustrate a method of handing over a UE from a 3G HNB, attached via a PS communications channel, to the BSS/RNS via a CS communications. FIGS. 8 and 9 illustrate a method of handing over a UE from an eNodeB, attached via a PS communications channel, to the 3G HNB via a CS communications channel.

Figure 2:
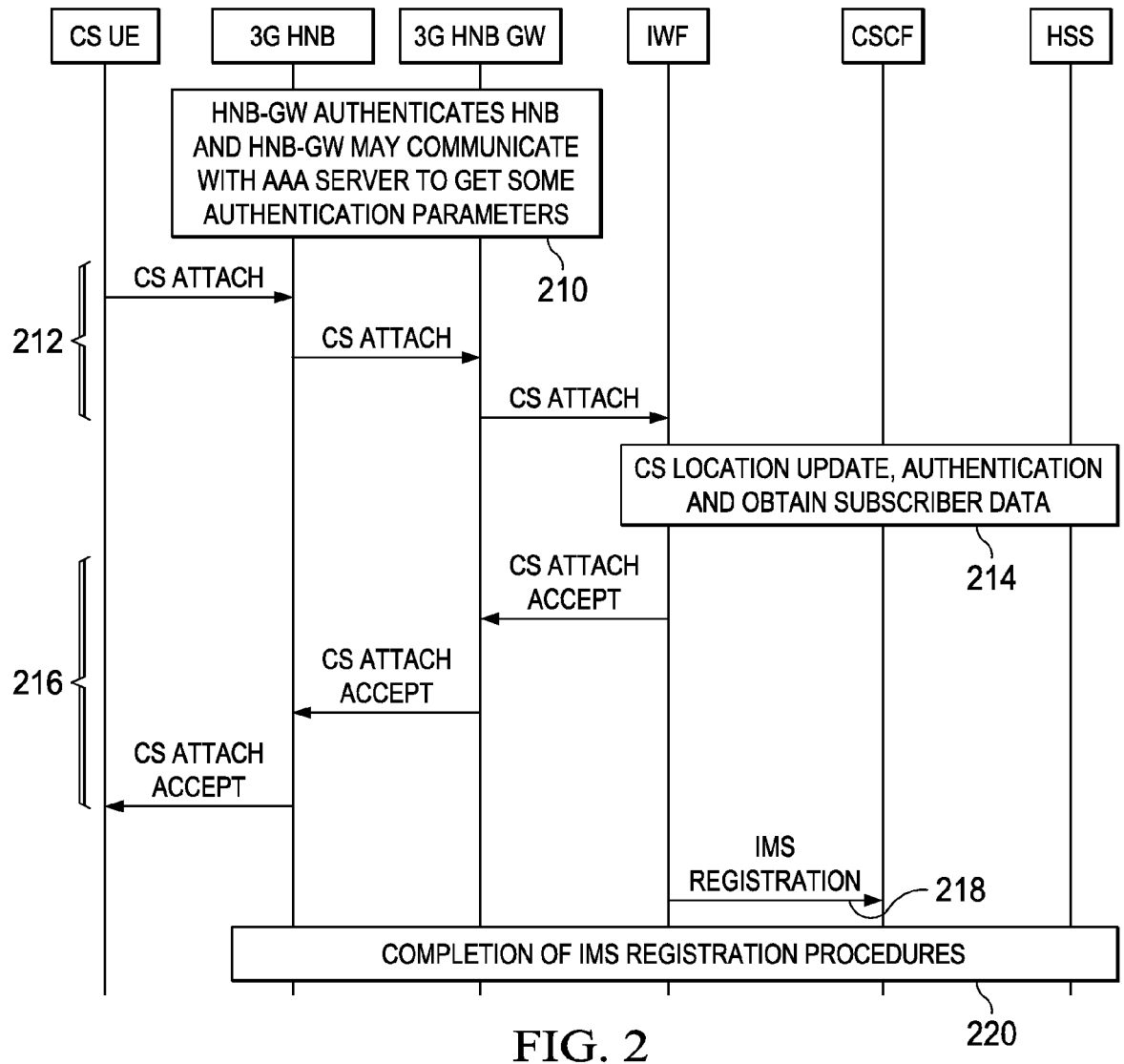
FIG. 2 illustrates a message flow diagram for circuit-switched user equipment network attachment in accordance with an embodiment of the present invention.

Referring now to FIG. 2, a message flow diagram that further illustrates an attach procedure that may be used is shown in accordance with an embodiment of the present invention. As indicated by reference numeral 210, the 3G HNB GW 120 authenticates the 3G HNB 116 and the connection between the 3G HNB 116 and the 3G HNB GW 120. This authentication process may involve, for example, communication with an authentication, authorization, and accounting (AAA) server. Additional information regarding this authentication process may be found in 3GPP TS 25.467, v8.2.0, which is incorporated herein by reference.

In step 212, the UE 110 initiates a CS attach procedure by transmitting a CS ATTACH message to the 3G HNB 116, which transmits the CS ATTACH message to the 3G HNB GW 120, which in turn forwards the CS ATTACH message to the IWF 132. Upon receiving the CS ATTACH message, the CS location of the UE 110 is updated between the IWF 132 and the HSS 124, which may include the appropriate HLR and VLR, in step 214. An authentication procedure is also performed to authenticate the UE 110 and to obtain subscriber data as indicated. The subscriber identity may be provided by the IWF 132 as part of radio access network application part (RANAP) common ID procedures, whereas the UE 110 identity may be provided by the UE as part of a check in an international mobile equipment identify (IMEI) procedure. Additional information regarding the CS location update and UE registration to the 3G HNB GW 120 may be found in 3GPP TS 25.467, v8.2.0, which is incorporated herein by reference.

After the CS attach procedure is completed, a CS ATTACH ACCEPT message is transmitted from the IWF 132 to the UE 110 via the 3G HNB 116 to signify that the CS attach was successful in step 216. This completes the CS attachment procedure for mobility within the CS domain.

Upon successful completion of the CS attach procedure, the IWF 132 initiates an IMS registration procedure by transmitting, e.g., an IMS REGISTER message, to the CSCF 122 in step 218. Thereafter, in step 220, an IMS registration procedure is performed using, for example, a procedure similar to an early IMS registration, thereby completing the session control attach procedure in the IMS domain.

It should be noted that the above message flow diagram is a high level description of a process in accordance with an embodiment of the present invention. Other embodiments may utilize different messages and/or additional messages. Furthermore, additional procedures, such as authorization procedures, may also be performed. Each message may include various parameters.

Figure 3:
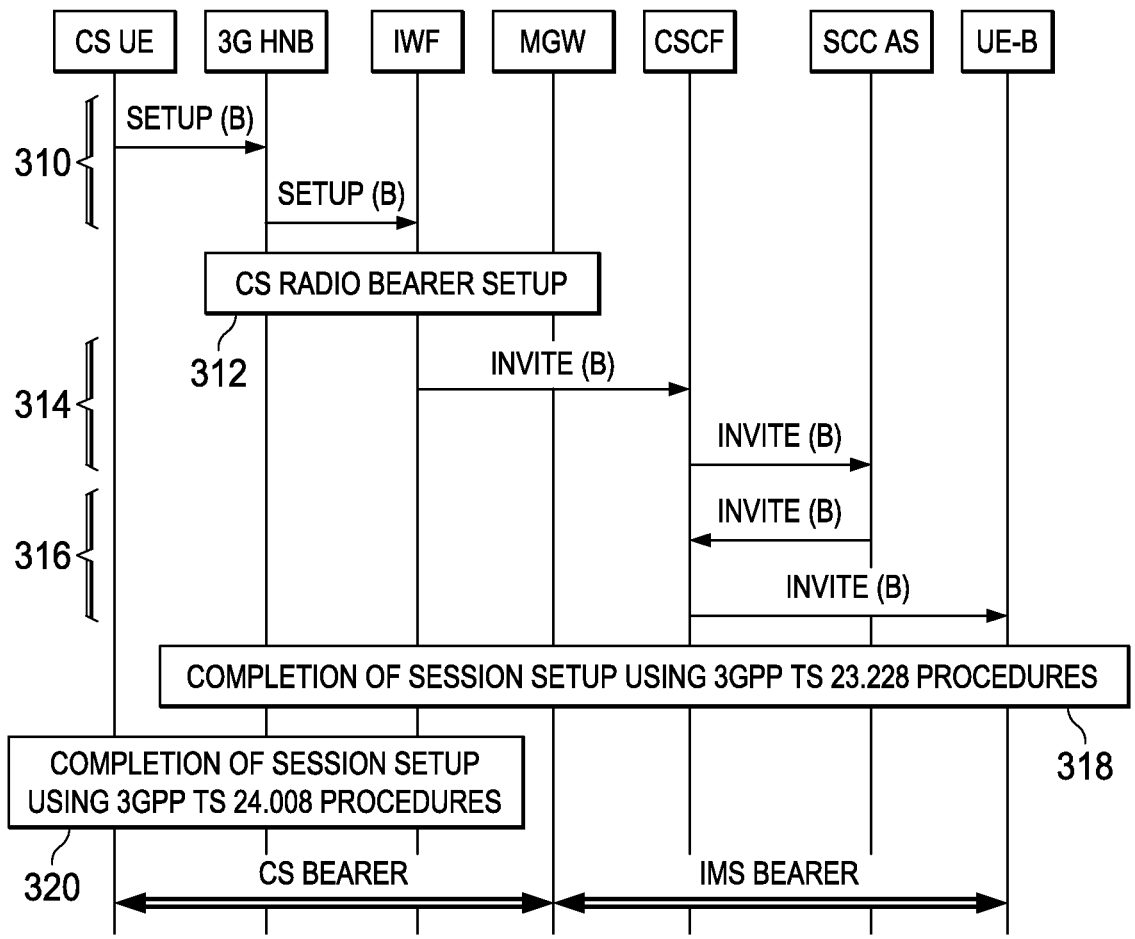
FIG. 3 is a message flow diagram illustrating session setup in accordance with an embodiment of the present invention.

FIG. 3 is a message flow diagram session setup process for the UE 110 to connect via the IMS network in accordance with an embodiment of the present invention. The process begins in step 310, wherein the UE 110 issues a setup request identifying the other party, e.g., UE-B. Upon receipt of the SETUP request, the 3G HNB 116 forwards the SETUP request to the IWF 132. The UE 110, the 3G HNB 116, IWF 132, and the MGW 134 negotiate to setup a CS bearer channel, as indicated by step 312.

In step 314, the IWF 132 transmits the INVITE message to the SCC AS via the CSCF, and in step 316, the SCC AS transmits the INVITE message to the designated third party, e.g., UE-B in this case. Thereafter, the IMS session between the 3G HNB 116 and UE-B is completed using, for example, techniques as defined in 3GPP TS 23.228, v9.0.0 and 3GPP TS 23.292, v9.2.0, which are incorporated herein by reference, as illustrated in step 318, and the CS session between UE 110 and the 3G HNB 116 using, for example, techniques defined in 3GPP TS 24.008, v8.6.0, which is incorporated herein by reference, as illustrated in step 320. As a result, a CS bearer channel is established between the UE 110 and the MGW 134, and an IMS bearer channel is established between the MGW 134 and UE-B, wherein the MGW 134 interfaces between the CS domain and the IMS domain.

Referring now to FIGS. 4 and 5, there is shown a method of handing over a UE from being serviced by the 3G HNB 116 to being serviced by the BSS/RNS 112 in accordance with an embodiment of the present invention. This embodiment assumes that the UE 110 is a legacy CS UE and has previously performed a CS attach procedure and registered for IMS services by an attach and registration procedure such as that discussed above with reference to FIGS. 2 and 3. Accordingly, the UE 110 is initially attached to the 3G HNB 116 and 3G HNB GW 120. The bearer channel is routed to the MGW 134, which provides connectivity to the remote end. The signaling channel is routed to the IWF 132, which acts as a SIP agent to convert the CS signaling messages to SIP messages. The IWF 132 then forwards the SIP messages to the CSCF/SCC AS/TAS 122 and the remote end.

After handover, the UE 110 is attached to the BSS/RNS 112, which provides connectivity to the MSC 114. The MSC 114 forwards the CS bearer channel to the MGW 134, which communicates with the remote end via an IP bearer channel. The MSC 114 forwards the CS signaling channel to the IWF 132, which acts as a SIP agent to convert the CS signaling messages to SIP messages before forwarding the signaling messages to the CSCF 122.

FIG. 5 is a message flow diagram that illustrates a method of performing the handover discussed above with reference to FIG. 4 in accordance with an embodiment of the present invention. At an initial stage, a session is established between the UE 110 and another party, designated as UE-B in this embodiment. In step 510, radio measurements between the UE 110 and the 3G HNB 116 trigger a handover procedure from the 3G HNB 116 to the macro CS.

Thereafter, in step 512, the 3G HNB 116 signals to the IWF 132 that a handover is required by, for example, a HANDOVER REQUIRED message. In response, the IWF 132 signals to the appropriate CS network element, e.g., the MSC 114, to prepare for a handover, providing it with the necessary information in step 514. The handover may be completed per the procedure defined within 3GPP TS 23.009, v8.1.0, which is incorporated herein by reference, as indicated in step 516. Upon completion of the handover procedure, the access leg with the 3G HNB 116 may be released.

One of ordinary skill in the art will realize that at this point the bearer channel extends from the UE 110 to the MSC 114 (via the BSS/RNS 112) to the MGW 134 to the remote end (e.g., UE-B in this case).

Referring now to FIGS. 6 and 7, there is shown a method of handing over the UE 110 from being serviced by the 3G HNB 116 to being serviced by the BSS/RNS 112 in accordance with an embodiment of the present invention. This embodiment assumes that the UE 110 is a 2G/3G multi-mode UE and has previously performed an attach procedure and registered for IMS services as are known in the art. Accordingly, the UE 110 is initially attached to the 3G HNB 116 and 3G HNB GW 120 via an IMS signaling and IP bearer channels using PS communications. The bearer channel is routed to the 3G PS Core 118, which provides connectivity to the remote end. The signaling channel is routed to the 3G PS Core 118, which interfaces with the CSCF 122 via SIP messages.

After handover, the UE 110 is attached to the BSS/RNS 112, which provides connectivity to the MSC 114. The MSC 114 forwards the CS bearer channel to the MGW 134, which communicates with the remote end via the IP bearer channel. The MSC 114 forwards the CS signaling channel to the IWF 132, which acts as a SIP agent to convert the CS signaling messages to SIP messages.

FIG. 7 is a message flow diagram that illustrates a method of performing the handover discussed above with reference to FIG. 6 in accordance with an embodiment of the present invention. At an initial stage, a session is established between the UE 110 and another party, designated as UE-B in this embodiment. In step 710, radio measurements between the UE 110 and the 3G HNB 116 trigger a handover procedure from the 3G HNB 116 to the macro CS.

Thereafter, in step 712, the 3G HNB 116 signals that a handover is required by, for example, a RELOCATION REQUIRED message to the 3G PS Core 118, which forwards the message to the IWF 132. In step 714, the IWF 132 transmits an INVITE message to the SCC AS via the CSCF. The active session with the UE-B may be transferred using procedures defined in 3GPP TS 23.216, v9.0.0 and/or 3GPP TS 23.237, v9.1.0, both of which are incorporated herein by reference, as indicated in step 716.

The handover may be completed per the procedure defined within 3GPP TS 23.009, v8.1.0, which is incorporated herein by reference, as indicated in step 718. Upon completion of the handover procedure, the access leg with the 3G HNB 116 may be released.

One of ordinary skill in the art will realize that at this point the bearer channel comprises a CS bearer channel extending from the UE 110 to the MSC 114 (via the BSS/RNS 112) to the MGW 134 and an IMS bearer channel between the MGW 134 and the remote end (e.g., the UE-B in this case).

Referring now to FIGS. 8 and 9, there is shown a method of handing over the UE 110 from being serviced by the eNodeB 126 using PS communications to being serviced by the 3G HNB 116 using CS communications in accordance with an embodiment of the present invention. This embodiment assumes that the UE 110 is a 2G/3G/4G multi-mode UE and has previously performed an attach procedure and registered for IMS services with the SAE Core 128 as is known in the art. Accordingly, the UE 110 is initially attached to the eNodeB 126 and the SAE Core 128 via an IMS signaling and IP bearer channels using PS communications. The bearer channel is routed to the SAE Core 128, which provides connectivity to the remote end. The signaling channel is routed to the SAE Core 128, which interfaces with the CSCF 122 via SIP messages.

After handover, the UE 110 is attached to the 3G HNB 116, which provides connectivity to the IMS network. The 3G HNB 116 forwards the CS bearer channel to the MGW 134, which communicates with the remote end via the IP bearer channel. The 3G HNB 116 forwards the CS signaling channel to the IWF 132, which acts as a SIP agent to convert the CS signaling messages to SIP messages.

FIG. 9 is a message flow diagram that illustrates a method of performing the handover discussed above with reference to FIG. 8 in accordance with an embodiment of the present invention. At an initial stage, a session is established between the UE 110 and another party, designated as UE-B in this embodiment via the LTE PS network. In step 910, radio measurements between the UE 110 and the eNodeB 126 trigger a handover procedure from the eNodeB 126 to the 3G HNB 116.

Thereafter, in step 912, the eNodeB 126 signals that a handover is required by transmitting, for example, a RELOCATION REQUIRED message to the SAE Core 128, which forwards the message to the IWF 132. In step 914, the IWF 132 transmits an INVITE message to the SCC AS via the CSCF. The active session with the UE-B may be transferred using procedures defined in 3GPP TS 23.216, v9.0.0 and/or 3GPP TS 23.237, v9.1.0, both of which are incorporated herein by reference, as indicated in step 916.

The handover may be completed per the procedure defined within 3GPP TS 23.009, v8.1.0, which is incorporated herein by reference, as indicated in step 918. Upon completion of the handover procedure, the access leg with the eNodeB 126 may be released.

One of ordinary skill in the art will realize that at this point the bearer channel comprises a CS bearer channel extending from the UE 110 to the MGW 134 (via the 3G HNB 116 and the 3G PS Core 118) and an IMS bearer channel between the MGW 134 and the remote end (e.g., the UE-B in this case).

Figure 10:
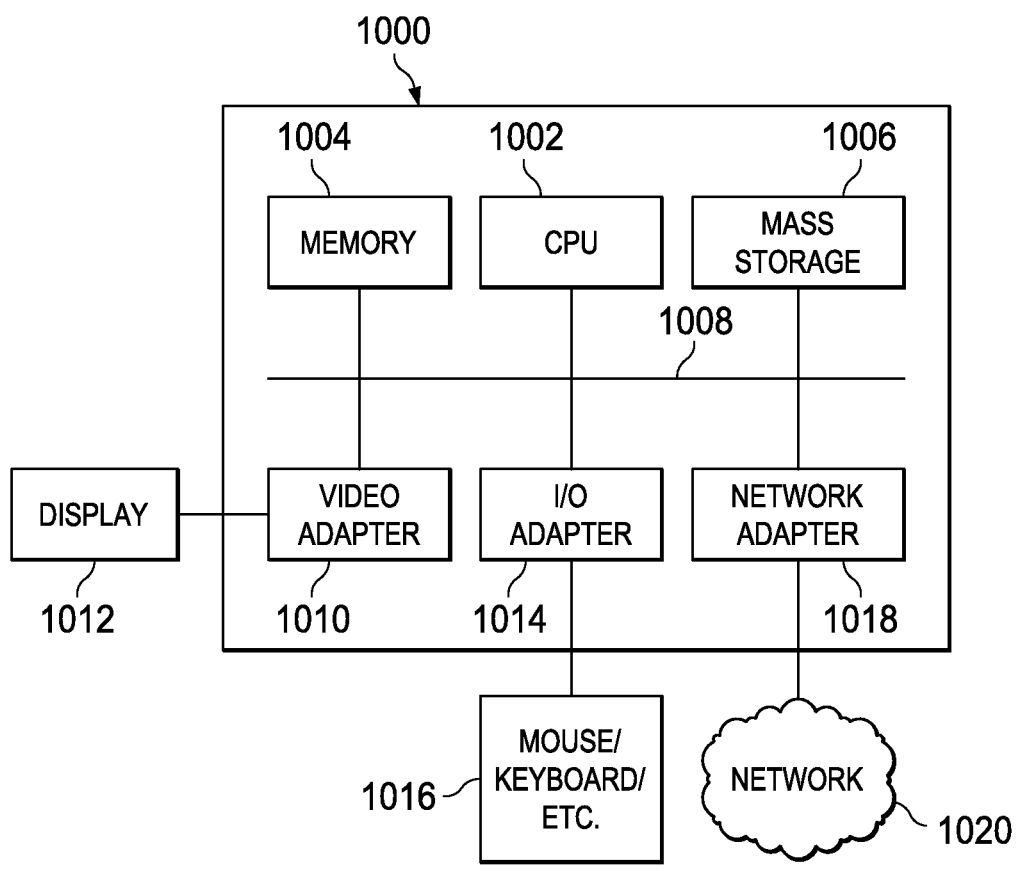
FIG. 10 is a block diagram of a network element in accordance with an embodiment of the present invention.

Referring now to FIG. 10, a block diagram of a network element 1000 is provided in accordance with an embodiment of the present invention. The network element 1000 depicts a general purpose platform and the general components and functionality that may be used to implement any or all of the UE 110, the SCC AS/CSCF 122, 3G HNB 116, HNB GW 120, MGW 134, IWF 132, and/or the like. The network element 1000 may include, for example, a central processing unit (CPU) 1002, memory 1004, and a mass storage device 1006 connected to a bus 1008 configured to perform the processes discussed above. The network element 1000 may further include, if desired or needed, a video adapter 1010 to provide connectivity to a local display 1012 and an I/O Adapter 1014 to provide an input/output interface for one or more input/output devices 1016, such as a mouse, a keyboard, printer, tape drive, CD drive, or the like.

The network element 1000 also includes a Network Adapter 1018, which may be a wired link, such as an Ethernet cable or the like, and/or a wireless/cellular link for communications with a network 1020. In an embodiment, the network interface 1018 comprises a switching fabric for switching bearer and signaling channels. The network interface 1018 may also comprise a suitable receiver and transmitter for wireless communications. It should be noted that the network element 1000 may include other components. For example, the network element 1000 may include power supplies, cables, a motherboard, removable storage media, cases, and the like. These other components, although not shown, are considered part of the network element 1000.

As one of ordinary skill in the art will appreciate, various embodiments of the invention provide a multitude of advantages. For example, the preferred embodiment completely offloads the CS Core network of the session control signaling. It also provides service continuity with CS, as well as PS macro cellular. As discussed above, embodiments of the present invention offload the CS Core network of the session control signaling by placing the translation of CS signaling to SIP signaling in the IWF, placing mobility functions in the transport layer, as opposed to some other approaches that place these functions in the application layer requiring tunneling of transport layer information in application layer signaling.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that different network elements, messaging, protocols, and/or the like may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing a handoff from a Home Node B (HNB) to a Base Station System (BSS), the method comprising:
    establishing a first communications session between a user equipment (UE) and a remote end, the first communications session having a first bearer path and a circuit switched signaling path, the circuit switched signaling path extending from the HNB to an Interworking Function (IWF) without passing through a Media Switching Center (MSC); and
    handing over the first communications session to a second bearer path and a second signaling path, thereby handing off the UE from the HNB to the BSS, wherein the second signaling path extends from the BSS to the IWF via the MSC.

2. The method of claim 1, wherein the first bearer path includes a circuit-switched bearer channel that does not extend through the MSC.

3. The method of claim 1, wherein the IWF communicates the circuit switched signaling path to a Call Session Control Function (CSCF) via Session Initiation Protocol (SIP) messages.

4. The method of claim 1, wherein the IWF communicates the second signaling path to a Call Session Control Function (CSCF) via Session Initiation Protocol (SIP) messages.

5. The method of claim 1, wherein the first bearer path extends through a Media Gateway (MGW), and wherein the MGW converts the first bearer path from a CS bearer channel to an IP bearer channel.

6. The method of claim 1, wherein the second bearer path extends through a Media Gateway (MGW), and wherein the MGW converts the second bearer path from a CS bearer channel to an IP bearer channel.

7. The method of claim 1, wherein the first bearer path extends through a Media Gateway (MGW).

8. The method of claim 1, wherein the second bearer path extends through a Media Gateway (MGW).

9. The method of claim 1, wherein the IWF communicates the first signaling path and the second signaling path to a Call Session Control Function (CSCF).

10. A method for performing wireless communications, the method comprising:
    establishing a first communications session between user equipment (UE) and a remote end extending through an Enhanced Node B (eNB), the first communications session having a first bearer path and a first signaling path, the first bearer path including a packet-switched communications path; and
    handing over the first communications session from the eNB to a home node B (HNB), wherein handing over the communications session comprises switching from the first bearer path to a second bearer path and from the first signaling path to a circuit switched signaling path, the second bearer path including a circuit-switched communications path, the second signaling path extending through a Home Node B (HNB) and an Interworking Function (IWF), but not through a media switching center (MSC).

11. The method of claim 10, wherein the second bearer path extends through a Media Gateway (MGW), and wherein the MGW converts the second bearer path from a CS bearer channel to an IP bearer channel.

12. The method of claim 10, wherein the IWF converts signaling messages received over the circuit switched signaling path into Session Initiation Protocol (SIP) messages.

13. The method of claim 12, wherein the IWF forwards the SIP messages to a Call Session Control Function (CSCF) over a packet switched signaling path.

14. The method of claim 10, wherein the HNB is a 3G HNB.

15. The method of claim 10, wherein the second bearer path extends through a Media Gateway (MGW).

16. The method of claim 10, wherein the IWF communicates the second signaling path to a Call Session Control Function (CSCF).

17. An interworking function (IWF) device comprising:
    a processor; and
    a computer readable storage medium storing programming for execution by the processor, the programming including instructions to:
    establish a communication session with a home gateway, the communications session including a circuit-switched signaling connection extending from a user equipment to the IWF device through both the home gateway and a home base station, but not through a media access controller (MSC); and
    handoff the communication session from the home base station to a base station subsystem (BSS), wherein handing off the communications session includes switching from the circuit switched signaling connection to a second signaling connection extending through the BSS and the MSC.

18. The IWF device of claim 17, wherein the programming further includes instructions to:
    convert circuit switched signaling messages received over the circuit switched signaling connection prior to the handoff, as well as signaling messages received over the second signaling connection after the handoff, into Session Initiation Protocol (SIP) messages; and
    forward the SIP messages to a Call Session Control Function (CSCF) via a packet-switched signaling connection.

19. The IWF device of claim 17, wherein the home base station is a 3G home base station (3G HNB).

20. The IWF device of claim 17, wherein the home gateway is a 3G Home Node B Gateway (3G HNB GW).

21. An interworking function (IWF) device comprising:
    a processor; and
    a computer readable storage medium storing programming for execution by the processor, the programming including instructions to:

establish a communication session with a home gateway, the communications session being initially established over a circuit-switched signaling connection extending from a user equipment to the IWF device through both the home gateway and a home base station, but not through a media access controller (MSC); and transfer the communication session to an evolved node B (eNB) upon receiving a relocation required message, wherein the instructions to transfer the communications session includes instructions to switch from the circuit switched signaling connection to a packet switched signaling connection extending from the user to a Call Session Control Function (CSCF) via the eNB.

22. The IWF device of claim 21, wherein the communications session is initially established over the circuit-switched signaling connection and a first bearer path,
wherein the instructions to transfer the communications session further include instructions to switch from the first bearer path to a second bearer path.

23. The IWF device of claim 22, wherein the first bearer path, the second bearer path, or both extend through a media gateway (MGW).

24. The IWF device of claim 21, wherein the programming further includes instructions to:
convert circuit switched signaling messages received over the circuit switched signaling connection into Session Initiation Protocol (SIP) messages; and
forward the SIP messages to a Call Session Control Function (CSCF) via a packet-switched signaling connection.

25. The IWF device of claim 21, wherein the home base station is a 3G home base station (3G HNB), and wherein the home gateway is a 3G Home Node B Gateway (3G HNB GW).

* * * * *